United States Patent [19]

Franzolini

[11] Patent Number: 4,703,391
[45] Date of Patent: Oct. 27, 1987

[54] TACHYMETRIC SIMULATION METHOD PROCESSING SIGNALS FROM AN INDUCTIVE POSITION TRANSDUCER AND CIRCUIT FOR CARRYING OUT SAID METHOD

[75] Inventor: Luciano Franzolini, Milan, Italy

[73] Assignee: el.ge Apparecchiature Elettroniche Industriali S.r.l., Italy

[21] Appl. No.: 616,685

[22] Filed: Jun. 4, 1984

[30] Foreign Application Priority Data

Jun. 7, 1983 [IT] Italy ................................ 21503 A/83

[51] Int. Cl.⁴ ............................................... G01P 3/52
[52] U.S. Cl. ..................................................... 361/240
[58] Field of Search ............... 318/608; 361/239, 240; 324/160, 163, 165, 176, 177; 340/670, 671, 672; 322/31

[56] References Cited

U.S. PATENT DOCUMENTS

| | | | |
|---|---|---|---|
| 3,501,651 | 3/1970 | Cottrell | 307/295 |
| 3,603,869 | 9/1971 | Neuffer et al. | 322/31 |
| 3,761,811 | 9/1973 | Aberle et al. | 324/173 |
| 4,379,221 | 4/1983 | Avins et al. | 377/43 |
| 4,481,468 | 11/1984 | Ono et al. | 324/165 |

FOREIGN PATENT DOCUMENTS 2830432 2/1980 Fed. Rep. of Germany .
3141015 6/1982 Fed. Rep. of Germany .
3209784 11/1982 Fed. Rep. of Germany .

*Primary Examiner*—L. T. Hix
*Assistant Examiner*—David M. Gray
*Attorney, Agent, or Firm*—Lane and Aitken

[57] ABSTRACT

A method and relative circuit in which, signals (sin $\phi M$, cos $\phi M$) detected by an inductive transducer, supplied by a suitable oscillator, are caused to pass through a RC circuit, to obtain an output signal (VA) out of phase by an angle ($\phi M$) proportional to the angle between the polar axis of the rotor and the polar axis of the stator of the transducer, in the case of a rotary detector. Two sets of signals are separately processed: the first set comprises the output signal of the oscillator (fr) and the output signal from the circuit RC (VA); the second set comprises the output signal from the circuit RC (VA) and a signal having the same frequency as the output signal from the oscillator, but out of phase by a fixed angle (F2). Each of these sets, are made to pass through a circuit for detecting the equivalence or not equivalence of the polarity of the input signals, then filtered, derived, in case inverted and then selected by a selecting means to output a tachymetric signal of infinite resolution.

8 Claims, 12 Drawing Figures

FIG.1
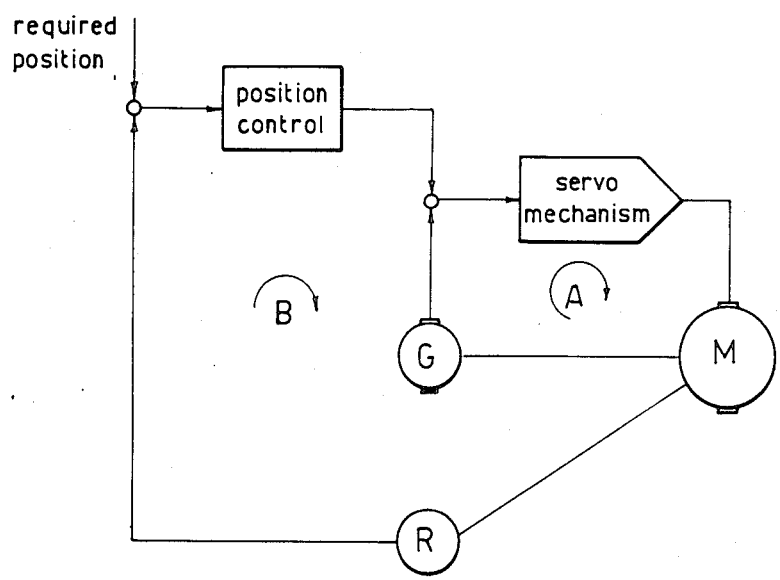
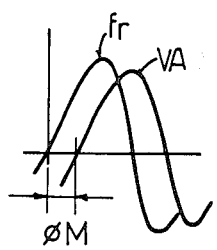
FIG.3

TACHYMETRIC SIMULATION METHOD PROCESSING SIGNALS FROM AN INDUCTIVE POSITION TRANSDUCER AND CIRCUIT FOR CARRYING OUT SAID METHOD

This invention is concerned with a method for tachymetric simulation, in which the signals from an inductive position transducer, for example comprising a "synchro", "resolver" or "inductosyn" and with a circuit for carrying out said method.

Recently, there is an increased demand for high precision servo-systems, particularly in the field of servo-mechanisms for operating machines, such as for example machine tools, robots, special machines and the like.

Usually, in said servo-mechanisms two transducers are used, one of which is a position transducer and the other is a speed transducer. FIG. 1 schematically shows the position of said transducer in the provided control loops, particularly in the speed control loop A the tachymetric dynamo G is arranged, while the position detector R usually of inductive type, such as for example a "resolver", "synchro" or "inductosyn" is arranged in the position control loop B. In high precision servo-mechanisms said speed control loop A is absolutely necessary.

Hitherto, the speed reference has been provided by a tachymetric dynamo, or recently by tachymetric alternators completed with angular sensors and followed by an electronic circuit for static and logic changeover of the output phases from the tachymetric alternator, so as to generate a continuous output voltage. Therefore, said device is added to the normally provided position detector.

In other apparatuses the use is provided of encoders. However, said apparatuses are of less worth, since the resolution is not infinite, but would depend on the number of pulses of the encoder, whereby the use thereof is restricted only to high speeds. Also this device is added to the normally provided position detector.

Other circuits are known wherein the signals outputted from a synchro or a resolver are detected, differentiated and combined so as to produce an output voltage which is proportional to the revolving speed of the transducer shaft (see U.S. Pat. No. 3,501,651 and FR. No. 1,128,567). The outputs of these circuits comprise a remarkable ripple due to the fact that the differentiated signal does not depend on the angular position of the transducer shaft according to a linear function, but according to a more complex function, such as arcsin or similars. Moreover the signal outputted from these circuits is proportional to the amplitude of the signals from the transducer, and therefore it is very responsive to their causal modifications of changes, due for example to input voltage changes, amplifier gain changes and temperature sudden changes.

Therefore, it is the object of the present invention to provide a method and relative electric circuit, in which the tachymetric detector is eliminated and particularly only an inductive position transducer is used, the output signals of which are suitably processed to supply an analogue (angular or linear), speed signal without ripples, as much as possible independent from causal changes of the transducer output, of infinite resolution, directly correlated to the speed value and motion direction.

It is an auxiliary object of the invention to provide a device of reduced cost and simple implementation.

The object is achieved by providing a method according to which, as known, a position signal is detected by means of an inductive transducer, for example a "synchro" or "resolver" or "inductosyn", supplied by a suitable oscillator, characterized by the fact that the signals outputted from said transducer are caused to pass through a RC circuit, to provide an output signal out of phase by an angle proportional to the angle between the polar axis of the rotor and the polar axis of the stator of the transducer (in the case of a rotary transducer), and wherein two sets of signals from equal circuit portions are separately processed, in which the first set comprises the output signal from the oscillator and the output signal of the RC circuit, while the second set of signals comprises the output signal from the RC circuit (VA) and a signal having the same frequency (fr) with respect to the oscillator signal, but out of phase by a fixed angle (F2). Each of said sets of signals are caused to pass through a circuit for detecting the equivalence or not equivalence of the polarity of the input signals, then through at least one filtering element, derived, in the case inverted, and finally selected by a selecting means to output a tachymetric signal of infinite resolution, the absolute value of which is proportional to the speed of rotation and the polarity of which depends on the motion direction.

The circuit for carrying out said method provides an inductive transducer, either a "synchro" or "resolver" or "inductosyn", supplied by an oscillator means of a predetermined frequency, characterized by the fact that the output of said transducer is connected to a RC circuit to provide at the output a signal (VA) out of phase by an angle proportional to the angle formed between the polar axis of the rotor and the polar axis of the transducer stator (in the case of a rotary transducer), wherein two sets of signals—of which the first comprises the output signal from the RC circuit (VA) and the output signal from the oscillator (fr), while the second set comprises the output signal from the RC circuit (VA) and the signal having the same frequency as the signal provided by the oscillator, but out of phase by a fixed angle (F2)—are processed by equal portions of the circuit, each portion comprising a circuit for detecting the equivalence or not equivalence of the polarities for the input signals, at least one low-pass filtering means, having a lower cutting frequency than the oscillator frequency (fr), a deriving means (a means which outputs the derivative of the input signal) and at least one inverting means. Finally, a selector means is arranged for suitably selecting the signals produced by said equal portions of the circuit, to provide at the output a tachymetric signal closely correlated to the speed of rotation and to the direction of rotation and without any discontinuity.

A further improvement provides that a "NOT" or polarity inversion type of analogue circuit is arranged in series with each deriving means for the processing of the two sets of signals, so as to obtain also a complementary signal with respect to the output signal from the deriving means.

A preferred embodiment provides that the selecting device comprises a static changeover switch, each element of which is connected to the output of the deriving means and to its complementary signal. Said selecting device is operated by a suitable logic circuit having at the input the signals produced by the filtering means as suitably processed by intermediate means. For example, said intermediate means comprise three "trigger"

devices, each of which having different threshold levels.

An embodiment of the invention will now be shown and explained with reference to examples and diagrams shown in the following, particularly:

FIG. 1 is a view schematically showing the control loops for a servo-mechanism as implemented at present according to the prior art;

FIG. 3 shows the waveforms of the output VA and fr with reference to FIG. 2;

Figure 7:
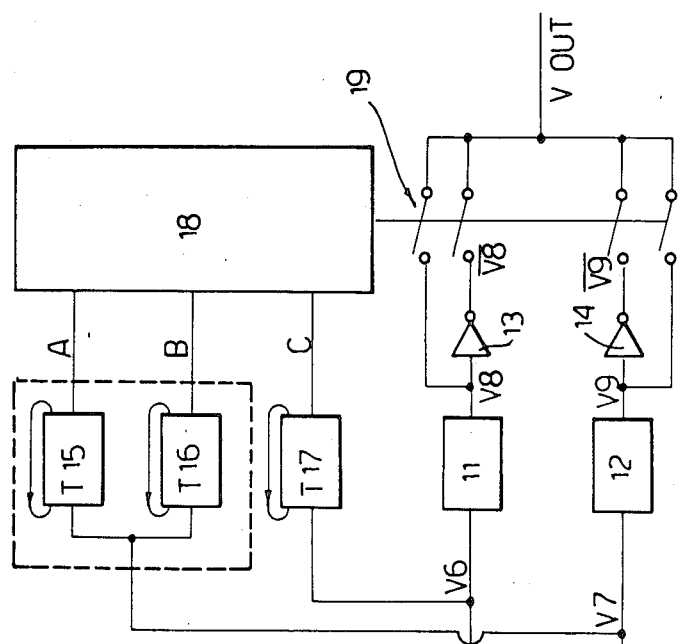
Figure 2:
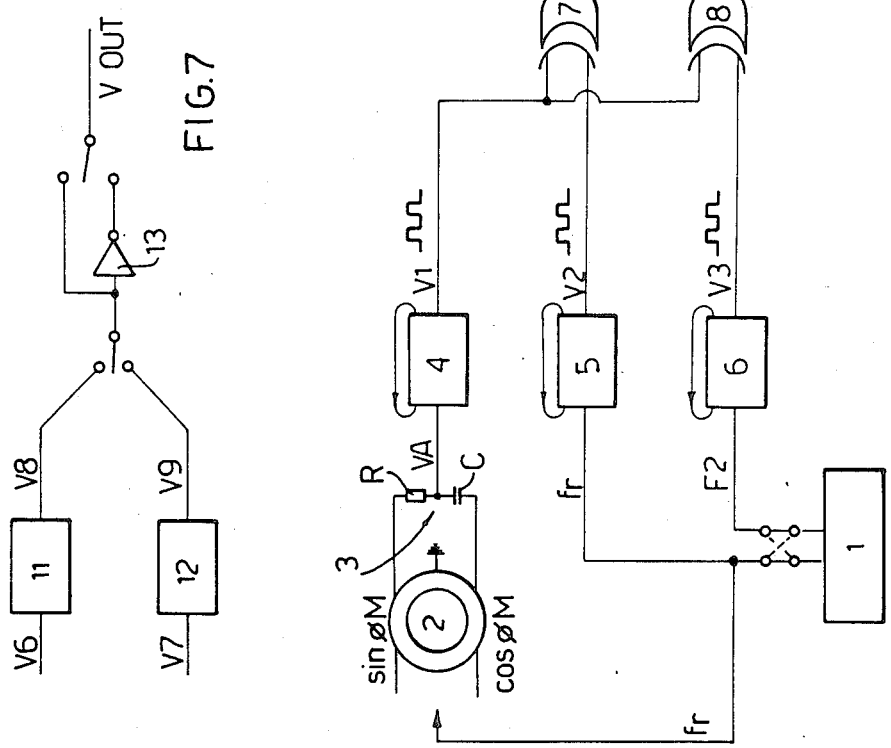
FIG. 2 is a view schematically showing a circuit according to the invention.
Figure 4:
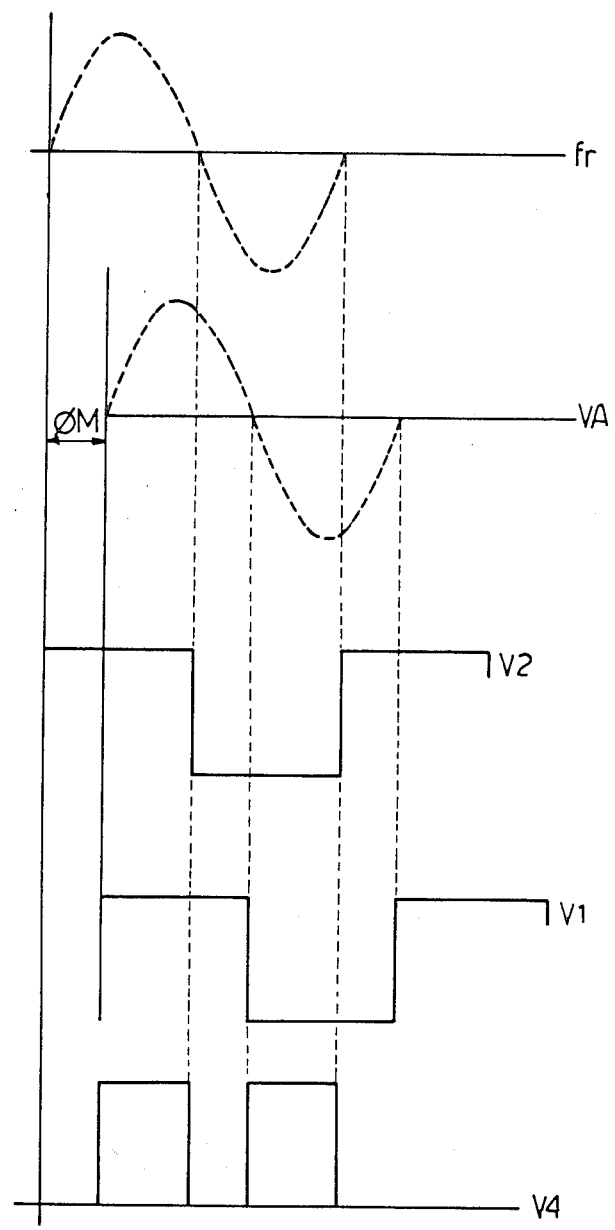
Figure 5:
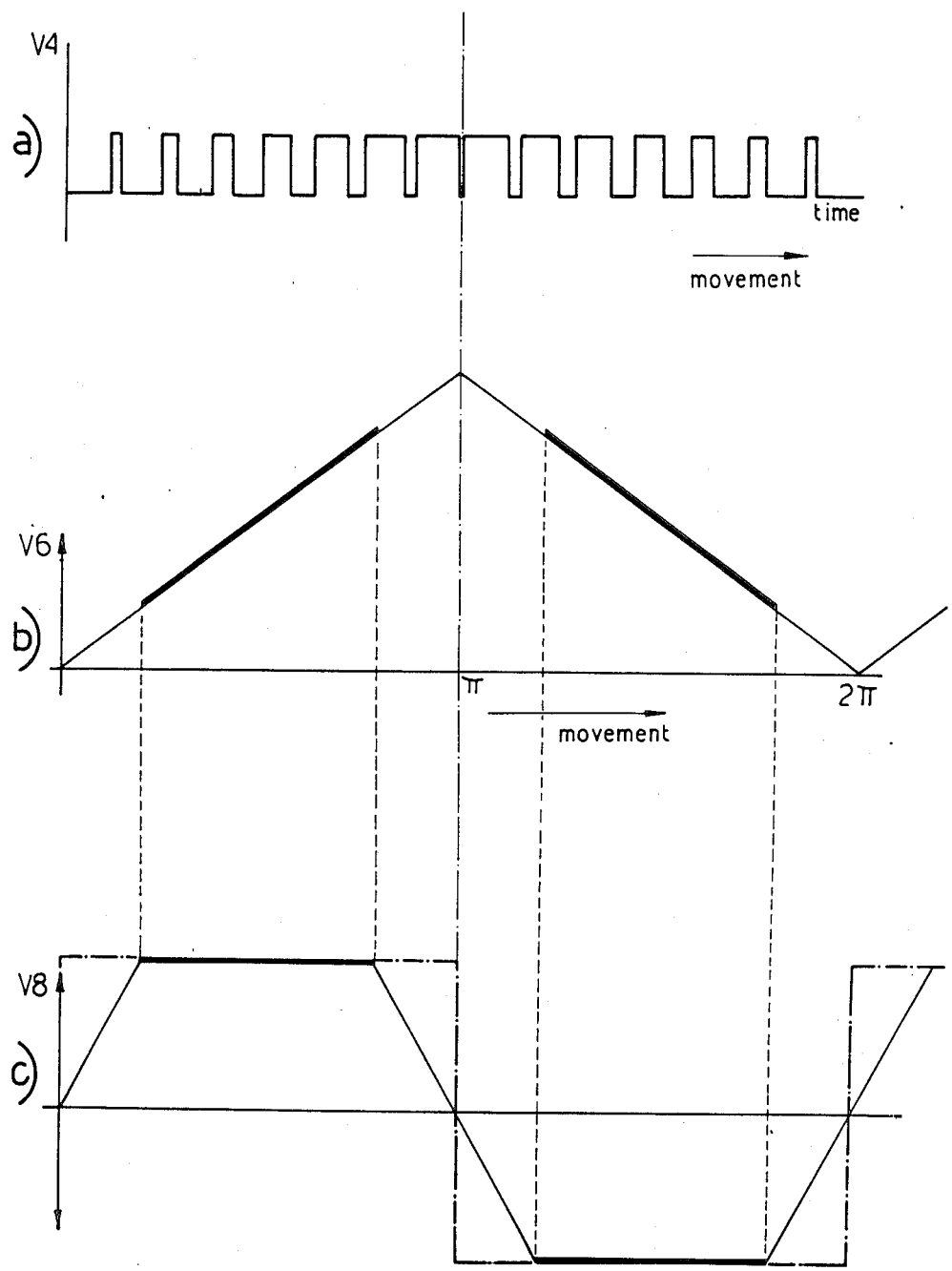
Figure 6:
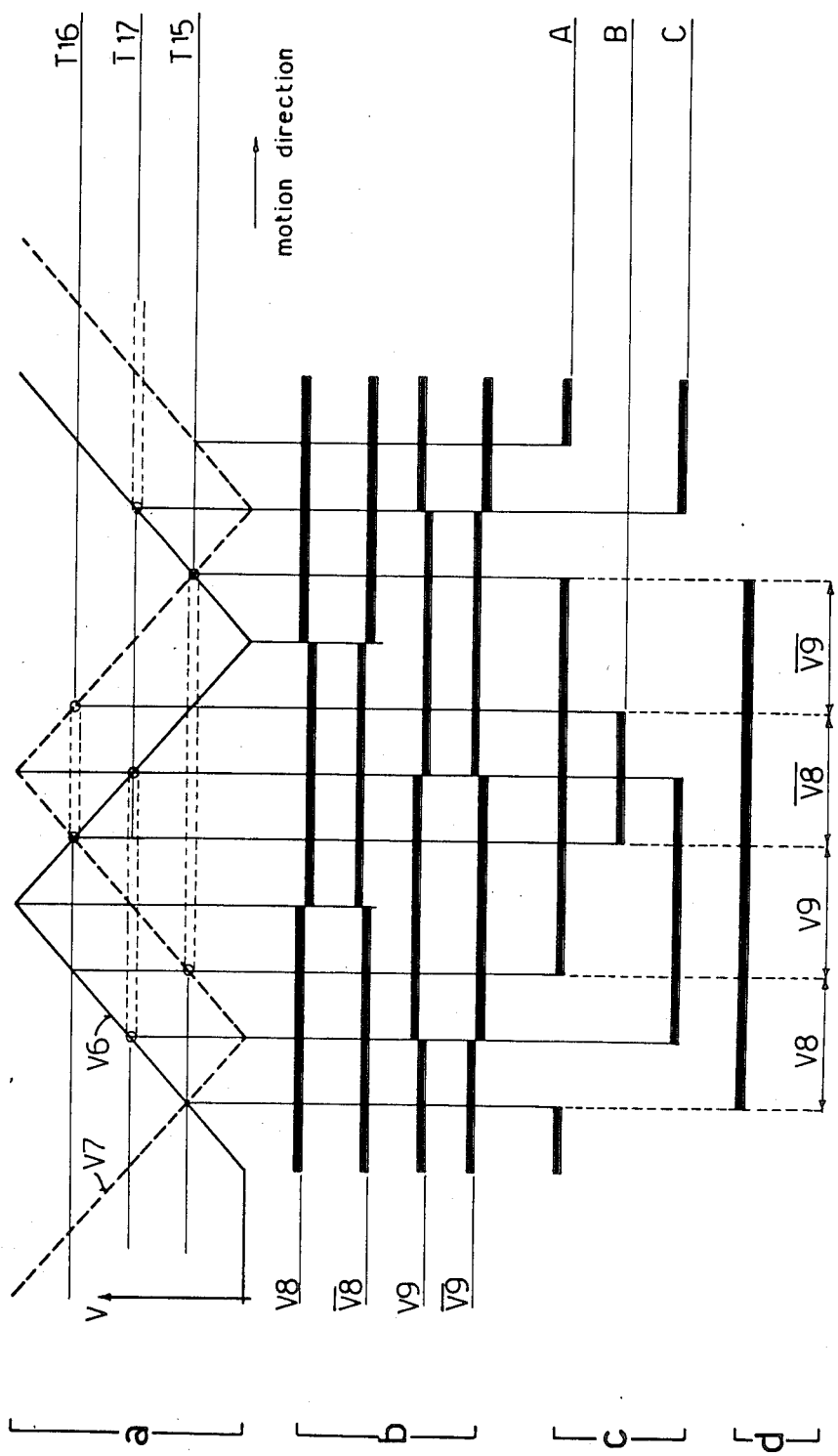

FIG. 4 schematically shows some waveforms, respectively fr, VA, V1, V2 and V4 for the circuit of FIG. 2;

FIG. 5 schematically shows still other waveforms of the circuit, respectively the waveform V4 (part a), V6 (part b) and V8 (part c);

FIG. 6 with its parts, a, b, c, and d, respectively, shows the successive processing of the output signals from the various portions of the circuit; and FIG. 7 is an alternative of the circuit for processing output signals from the deriving means 11 and 12.

A circuit according to the invention comprises an inductive transducer. For example, it may comprise a "synchro", "resolver" or "inductosyn". Said circuit is supplied by the oscillator 1, which generates a signal having a frequency fr of about 10K Hz. When using a "synchro" as a trasducer a two-phase output can be obtained through a Scott transformer.

Said transducer 2 is followed by a RC type of circuit, denoted as a whole at 3. It is well known that, for this type of configuration, should the condition $\omega RC = 1$ be satisfied, in which $\omega = 2\pi fr$, then the output signal VA (at the same frequency fr) has a constant amplitude and is out of phase by an angle $\phi M$ proportional to the angle formed between the polar axis of the rotor and the polar axis of the stator of the transducer, in the case of a rotary transducer, or anyhow between the movable portion and the fixed or stationary portion. This has been schematically shown in FIG. 3.

The VA signal comes from the combination of sin $\phi M$ and cos $\phi M$ signals outputted from the transducer, which are not separately used in any following portion of the circuit.

Continuing in the description of the several components of FIG. 2, let us now consider the first set of signals comprising the output signal VA from the RC circuit 3 of FIG. 2 and the output signal fr from the oscillator 1. Said signals are squared by the squaring means 4 and 5, respectively, and then sent to a circuit for providing the logic function of "exclusive NOR", also referred to as "equivalence circuit". This logic circuit has at the output a binary signal, which is 1 when both of the binary inputs are the same and, on the other hand, has at the output a 0 when the inputs are different. Similarly, the circuit may be of "exclusive OR" or "non-equivalence circuit" type, having at the output a signal equal to 1 if the inputs have different polarities and 0 when have the same polarity. Said output is complementary to that provided by the "exclusive NOR" circuit and accordingly out of phase relative thereto. Thus, according to the invention a circuit is required as capable of sensing the equivalence or not equivalence between the polarities of the input signals and accordingly differentiate the output signal. At the output the signal V4 is provided. The respective output waveforms from the devices 1, 2, 3, 4, 5 and 7 are schematically shown in FIG. 4.

Therefore, said signal V4 comprises a pulse train (pulse group) having frequency fr, pulse duration depending on a function of the mechanical angle $\phi M$ which comprises linear portions.

FIG. 5 and particularly its part "a" shows-for signal V4 for a period corresponding to a $2\pi$ rotation of the transducer at constant speed. Then, this signal V4 is caused to pass through a low-pass filter device 9 with a lower cutting frequency than the frequency fr produced by the oscillator, so as to eliminate said frequency.

Said filter device detects the average value of said signal. Said output signal V6, shown in the part "b" of FIG. 5, has two features which will be useful in the following:

(a) its value directly depends on said angle $\phi M$, so that it represents a space;

(b) it is symmetrical with respecto to $\pi$.

Now, the signal is supplied through a deriving means 11, to provide thereby a derivative of said signal V6. The output signal V8 is shown in the part "c" of FIG. 5. The ideal signal of the derivative is shown by dashed line, while by full line the signal is shown as provided by the apparatus at present available. The signal V8 is a speed, either of angular or linear type, which is nothing but the derivative of space in time. Therefore it does not comprise spurious ripples. Said signal is made to pass through an inverter element 13 so as to provide at the output its complement $\overline{V8}$.

Upon derivation of signal V6, in case of constant motion speed, a signal is obtained of constant absolute value, but which modifies its polarity at each half-period of transducer shaft rotation. Therefore, this signal is not yet suitable to be taken into account as a good tachymetric signal. Thus, at each half-period it has not linear zones, due to the inversions at each $\pi$.

Therefore, in order to obtain an accurate tachymetric signal, it is required to use with the due polarities only the surely linear parts of the system, that is remote from the inversions, i.e. those zones marked in heavy lines in the parts "b" and "c" of FIG. 5. To this aim a further processing chain is added, which provides a reference signal F2 out of phase by a fixed angle relative to fr. According to the preferred embodiment shown, such a signal is out of phase by $\pi/2$. However, the phase displacement is within $\pi$.

This second processing chain is to process the signal VA and F2, out of phase by $\pi/2$ relative to fr, in turn squared by the devices 5 and 6, made to pass through the equivalence circuit 8 or "exclusive NOR", filtered by the device 10, derived by the deriving means 12 and providing at the output the signal V9. The signal $\overline{V9}$ is produced after passing through the inverter 14. Should the first processing chain have provided an "exclusive OR", also this second processing chain should provide an "exclusive OR".

As it will be appreciated, the signal V6 and V7 are hitherto independent of the motion direction. They are shown at superimposed position in the part "a" of FIG. 6. The signals V8, V9, $\overline{V8}$ and $\overline{V9}$, shown in the portion "b" of FIG. 6, for an assumed clockwise angular movement, are instead depending on the motion direction. Thus, it is obvious that, should the rotation be in opposite direction, the signals would invert the polarity thereof (thus, the derivative is inverted). The absolute value thereof is instead proportional to the speed value, either linear or angular.

FIG. 7 is a view showing an alternative circuit for producing the signals V8, $\overline{V8}$, V9 and $\overline{V9}$. It provides only one inverter 13 and changeover switches suitably operated by a logic circuit.

Now, the problem is to suitably select these signals to provide at the output a tachymetric signal having no discontinuities in connection with a continuous motion.

The selection between these four signals may be operated by a suitable selector means. An example is represented with reference to the components T15, T16, T17 and 18 and by the static changeover switch 19 of the circuit (FIG. 2). At the output, this selector means has the desired tachymetric signal, which is shown with reference to the part "d" of FIG. 6. The logic changeover or switching takes place by using the trigger T15, T16 and T17 having the thresholds shown in the portion "a" of FIG. 6. The outputs thereof are the signals A, B and C. The output signal V OUT is determined on the basis of the following truth table, so as to operate the various elements of the static changeover switch 19.

| V OUT | A | B | C |
|-------|---|---|---|
| V8    | 0 | 0 | X |
| V9    | 1 | 0 | 1 |
| V8    | 1 | 1 | X |
| V9    | 1 | 0 | 0 |

The truth table for circuit of FIG. 7 is different, but readily deducible by those skilled in the art.

From the foregoing it will be appreciated that the signal V OUT is a signal with the absolute value closely correlated to the speed, while the polarity would depend on the motion direction. The signal V OUT is also without any discontinuity so as to provide a good tachymetric signal.

What I claim is:

1. A method for tachymetric simulation by processing the signals from an inductive position transducer energized with a single sinusoidal waveform supplied by an oscillator, comprising passing the output signals from the transducer through a RC circuit having resistance and capacitance values selected so that wRC=1, wherein w=2πfr, and fr is the frequency of the oscillation waveform, so as to obtain at the output of the RC circuit a signal out of phase by an angle proportional to the angle between the movable part and the fixed or stationary part of the transducer, then separately processing a first set of signals and second set of signals, the first set comprising the output signal from the oscillator and the output signal from the RC circuit, the second set comprising the output signal from the RC circuit and a signal having the same frequency as that provided by the oscillator, but out of phase by a fixed angle, said step of separately processing including passing each of said sets of signals through a circuit for sensing the equivalence or not-equivalence of the polarity of the input signals and producing output signals representing the sensed equivalence of not-equivalence, and then subjecting the resulting output signals to the action of at least one low-pass filtering means with lower cutting frequency than that of the oscillator, a deriving means and at least one inverting means to produce a set of processed signals, and then selectively applying the produced and processed signals to a common output to provide at the common output a tachymetric signal proportional to the speed of rotation and to the direction of rotation, but without any discontinuity and ripple.

2. A circuit for tachymetric simulation, comprising an inductive transducer, energized with a single sinusoidal waveform supplied by an oscillator, an RC circuit having resistance and capacitance values selected so that wRC=1, wherein w=2π fr, and fr is the frequency of the oscillator waveform, said RC circuit being connected to receive the output of said transducer to provide at the output of the RC circuit a signal out of phase by an angle proportional to the angle between the moveable part and the fixed or stationary part of the transducer, the output signal from the oscillator and the output signal from the RC circuit comprising a first set of signals, means providing a second set of signals comprising the output signal from the RC circuit and a signal at the same frequency as that provided by the oscillator, but out of phase by a fixed angle, an equivalence sensing circuit connected to sense the equivalence or not-equivalence of the polarity of the signals of said first set and of the signals of said second set, at least one low-pass filtering means with a lower cutting frequency than that of the oscillator, connected to filter the output from said equivalence sensing circuit, a deriving means connected to provide output signals representing the derivatives of the output of said filtering means and at least one inverting means connected invert one of the output signals of said deriving means, and a selector means to provide at the output a tachymetric signal closely correlated to the speed of rotation and to the direction of rotation, but without any discontinuity, from the output signals of said inverting means and said deriving means.

3. A circuit as claimed in claim 2, wherein squaring means are provided for each of the signals comprising the sets.

4. A circuit as claimed in claim 2, wherein a polarity inverter element is provided to obtain a complementary signal of each of the output signals of said deriving means.

5. A circuit as claimed in claim 2, wherein said selector means comprises a static changeover switch operated by a suitable logic signal from a logic circuit having at the input the output signals from the filtering means, processed through intermediate means.

6. A circuit as claimed in claim 5, wherein said intermediate means comprise at least three "trigger" devices having different threshold levels.

7. A circuit as claimed in claim 2, wherein said circuit for detecting the equivalence or not-equivalence for the polarity of the input signals comprises an "exclusive NOR" or "equivalence circuit".

8. A circuit as claimed in claim 2, wherein said circuit for sensing the equivalence or not-equivalence for the polarity of the input signals comprises an "exclusive OR" or "not equivalence" type of circuit.

* * * * *

UNITED STATES PATENT AND TRADEMARK OFFICE
CERTIFICATE OF CORRECTION

PATENT NO. : 4,703,391
DATED : October 27, 1987
INVENTOR(S) : Luciano Franzolini It is certified that error appears in the above-identified patent and that said Letters Patent are hereby corrected as shown below:

Column 5, line 57, "of" should be --or--.

Signed and Sealed this

Fifth Day of April, 1988

*Attest:*

DONALD J. QUIGG

*Attesting Officer*     *Commissioner of Patents and Trademarks*